(12) United States Patent
Justice et al.

(10) Patent No.: US 9,046,322 B2
(45) Date of Patent: Jun. 2, 2015

(54) SELF-CALIBRATING TARGETING SIGHT

(75) Inventors: James Justice, Newport Beach, CA (US); W. Eric Boyd, La Mesa, CA (US)

(73) Assignee: PFG IP LLC, San Francisco, CA (US)

( * ) Notice: Subject to any disclaimer, the term of this patent is extended or adjusted under 35 U.S.C. 154(b) by 425 days.

(21) Appl. No.: 13/292,325

(22) Filed: Nov. 9, 2011

(65) Prior Publication Data

US 2012/0126001 A1 May 24, 2012

Related U.S. Application Data

(60) Provisional application No. 61/458,306, filed on Nov. 22, 2010.

(51) Int. Cl.
| | |
|---|---|
| *G06F 19/00* | (2011.01) |
| *F41G 1/473* | (2006.01) |
| *F41G 1/38* | (2006.01) |
| *G02B 23/10* | (2006.01) |
| *F41G 3/06* | (2006.01) |
| *F41G 3/08* | (2006.01) |

(52) U.S. Cl.
CPC ........ *F41G 1/473* (2013.01); *F41G 1/38* (2013.01); *G02B 23/105* (2013.01); *F41G 3/06* (2013.01); *F41G 3/08* (2013.01)

(58) Field of Classification Search
CPC ......................................................... G06G 7/80
USPC ......................................................... 235/404
See application file for complete search history.

(56) References Cited

U.S. PATENT DOCUMENTS

| | | | |
|---|---|---|---|
| 2005/0268521 A1* | 12/2005 | Cox et al. | 42/130 |
| 2009/0283598 A1* | 11/2009 | Sherman | 235/404 |
| 2012/0033195 A1* | 2/2012 | Tai | 356/4.01 |

* cited by examiner

*Primary Examiner* — Rafferty Kelly
(74) *Attorney, Agent, or Firm* — Thomas M. Freiburger

(57) ABSTRACT

A targeting sight having viewing optics, a focal plane array and an alignment frame having an aperture that defines a target area that is mounted proximal the muzzle of a weapon. Electronic processing means is provided to define a crosshair in the viewing optics. The alignment frame is illuminated with a beam and the reflected portion of the beam is received by the focal plane array and is processed to position the crosshair with respect to the aperture.

6 Claims, 1 Drawing Sheet

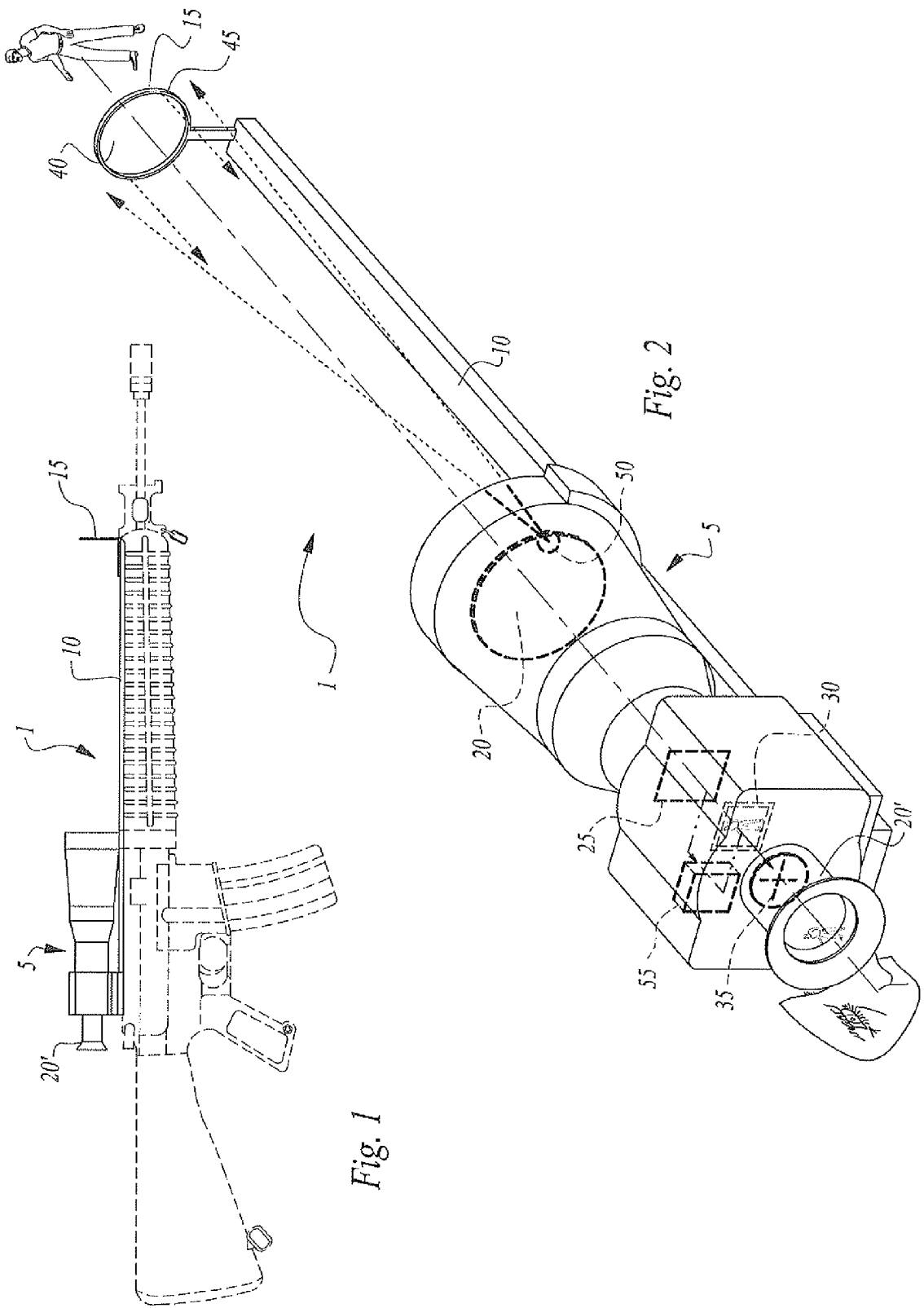

SELF-CALIBRATING TARGETING SIGHT

CROSS-REFERENCE TO RELATED APPLICATIONS

This application claims the benefit of U.S. Provisional Patent Application No. 61/458,306, filed on Nov. 22, 2010, entitled "Multi-spectral Rifle Sight Comprising Automatic Alignment Means" pursuant to 35 USC 119, which application is incorporated fully herein by reference.

STATEMENT REGARDING FEDERALLY SPONSORED RESEARCH AND DEVELOPMENT

N/A

BACKGROUND OF THE INVENTION

1. Field of the Invention

The invention relates generally to the field of optical and electronic sighting systems.

More specifically, the invention relates to an opto-electronic sighting or targeting system comprising a fixed alignment frame in cooperation and a laser illumination element to provide precision electronic positioning of an electronic reticle in a target area with respect to the alignment frame aperture.

2. Description of the Related Art

Prior art targeting sighting and reticle alignment systems such as are found in weapons sighting systems generally comprise an optical magnification system comprised of a series of optical lens elements with a reticle or "cross-hair" pattern provided such that the reticle is superimposed in an observer's field of view as seen through the eyepiece of sighting system.

When the optical targeting sighting system, which may comprise a telescopic sight or "scope", is properly fitted and aligned on, for instance, the barrel of a weapon, the alignment of the elements of the reticle with an object in the field of view (e.g., a target) will closely approximate the location where the projectile will strike.

It is common that conventional optical targeting sighting systems are provided with a mechanical X-Y adjustment means to permit small incremental adjustments in the position of the reticle pattern with respect to the muzzle of the weapon barrel.

The development of image intensification ("I²") and thermal imaging technologies has led to advances in weapon sights that provide the viewer with the ability to see a target in low-light and no-light environments.

Of particular value in no-light environments such as darkened buildings or caves or in smoke or dust obscured environments is the use of thermal imaging weapons sights. Thermal sighting systems that are sensitive to a region or multiple regions of the infrared spectrum (i.e., NIR, SWIR, MWIR, LWIR and FIR from about 0.75 to about 1000 micron wavelengths) are well-suited to the above low-light, low-visibility environments in that they permit a user to see heat differences or reflected infrared energy by sensing predetermined ranges of infrared spectra from objects in a scene of interest rather than relying on reflected light in the visible spectrum.

Infrared sensors, typically two-dimensional arrays of detector pixel elements in the form of focal plane arrays or "FPAs", are used for infrared imaging and are sensitive to defined bands of the electromagnetic spectrum, such as the LWIR and SWIR infrared bands, each of which has different electrical responses to different lighting environments. For instance, LWIR detectors are well suited to no-light and very low light environments while SWIR detectors provide useful outputs at dusk where there is some sunlight remaining, partially due to naturally-occurring atmospheric night glow or air glow created by hydroxyl ion emissions.

Accordingly, a multi-spectral targeting sight that provides an LWIR and SWIR display output is desirable for around-the-clock use without the need to reconfigure or replace the sight on the weapon. A SWIR/LWIR multi-color focal plane array rifle sight is desirable to provide 24/7 operation that automatically adjusts for varying environmental and viewing conditions through the integration of a digital signal processor within the rifle sight to ensure optimum control and operability and to provide wide spectral transmission (e.g., about 0.5-about 12.0 microns).

Unfortunately, prior art thermal sighting systems that have an electronically-generated reticle superimposed on the target image are prone to drift due to temperature, vibration or shock or other environmental factors. Performance effectiveness of prior art sighting systems, and rifle sighting systems in particular, is limited by the inability to operate in day, twilight and night conditions without significant, impractical reconfiguration.

Sighting system accuracy, and thus lethality, is degraded by environmentally-induced "drift" in aiming quality caused by such factors such as temperature and humidity changing the performance of electro-optical and alignment elements. Uncompensated crosswind velocity further degrades lethality.

The above deficiencies in the prior art coupled with the fact such systems generally comprise an imager that is sensitive to a single spectrum on the infrared region create a need for a self-calibrating, multi-spectral weapons sight.

BRIEF SUMMARY OF THE INVENTION

The invention comprises a targeting sight or sighting system comprising viewing optics and at least one focal plane array having, for instance, a responsivity in the 0.5 to 12 micron region of the electromagnetic spectrum.

The invention further comprises an alignment frame having an aperture that defines a target area that is mounted proximal to the muzzle of a weapon bore.

A preferred embodiment comprises a very wide spectral transmission (0.5-12.0 microns) single telescope with a minimum of 5× optical zoom, an eye-safe, pulsed SWIR 3D LIDAR for target recognition just prior to firing and digital processing to achieve an auto-align and aiming capability which compensates for electro-optical "drift" effects and crosswind velocity effects and provides a "subsequent shot" aiming correction by observing bullet traces and impact points.

Electronic processing and display means are provided to define and superimpose an electronic reticle or crosshair at a predetermined position in the viewer's sight. Illumination means is provided whereby the alignment frame is briefly illuminated with an electromagnetic beam and the reflected portion of the beam is received by the detector means. The detector means may comprise at least one focal plane array sensitive to at least one predetermined range of the electromagnetic spectrum in the sight housing.

The reflected beam from the alignment frame element is received and processed by the detector means and processing means elements of the invention and is used to electronically calculate and position an electronic reticle with respect to the alignment frame aperture.

In one embodiment, the invention may comprise a mounting rail having the alignment frame and sight housing affixed thereon, which assembly may be mounted on a weapon barrel. In this embodiment, the assembly is preferably separately calibrated in an environmentally-controlled location such as by using an optical bench calibration process to provide the precision, baseline "off weapon" calibration of the reticle position in the sight with respect to the alignment frame aperture.

In this manner, subsequent field calibration is based on the very precise reticle calibration data generated in the previous environmentally-controlled calibration operation.

In a first aspect of the invention, a targeting sight is provided comprising alignment frame means comprising an aperture defining a target area, a sight housing comprising optical viewing means for viewing the target area, detector means, electronic processing means for calculating a position within the target area based on an alignment frame illumination reflection received by the detector means and display means for displaying an electronic image at the predetermined position in the target area as seen by the viewer through the optical viewing means (i.e., an eyepiece).

In a second aspect of the invention, the targeting sight further comprises alignment frame illumination means for generating an alignment frame illumination reflection in a predetermined range of the electromagnetic spectrum.

In a third aspect of the invention, the alignment frame means comprises a ring member having a predetermined diameter.

In a fourth aspect of the invention, the alignment frame means comprises an electromagnetically reflective surface.

In a fifth aspect of the invention, the alignment frame illumination means comprises a laser having a wavelength of about the 0.05 micron to about the 12 micron range of the electromagnetic spectrum.

In a sixth aspect of the invention, the electronic image is a reticle.

In a seventh aspect of the invention, the electronic image is a cross-hair.

In an eighth aspect of the invention, the targeting sight comprises a mounting rail having the housing and alignment frame fixedly attached thereto.

In a ninth aspect of the invention, the detector means comprises at least one focal plane array having a responsivity in a predetermined range of the electromagnetic spectrum.

In a tenth aspect of the invention, the focal plane array having a responsivity in about the 0.05 micron to about 12 micron range of the electromagnetic spectrum.

In an eleventh aspect of the invention, the predetermined position of the image or reticle is further calculated based on one or more physical variables selected from the group consisting of humidity, temperature, altitude, barrel angle, air density, target range, latitude and longitude, ammunition load data, projectile velocity data, ammunition caliber and ballistic coefficient data.

These and various additional aspects, embodiments and advantages of the present invention will become immediately apparent to those of ordinary skill in the art upon review of the Detailed Description and any claims to follow.

While the claimed apparatus and method herein has or will be described for the sake of grammatical fluidity with functional explanations, it is to be understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112, are to be accorded full statutory equivalents under 35 USC 112.

BRIEF DESCRIPTION OF THE SEVERAL VIEWS OF THE DRAWINGS

FIG. 1 depicts a rifle having a preferred embodiment of the self-calibrating targeting sight of the invention mounted thereon.

FIG. 2 depicts a preferred embodiment of the targeting sight showing the sight housing, mounting rail and alignment frame means of the invention.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE INVENTION

Turning now to the figures wherein like numerals define like elements among the several views, a self-calibrating targeting sight is disclosed.

FIG. 1 illustrates a preferred embodiment of the targeting sight 1 of the invention mounted as a weapon sight on the barrel of a rifle.

FIG. 2 depicts a preferred embodiment of the targeting sight 1 showing the sight housing 5, mounting rail 10 and alignment frame means 15 of the invention.

Targeting sight 1 comprises optical viewing means 20 which may comprise a plurality of optical lens elements for viewing and magnifying a scene of interest through an eyepiece 20'.

Zoom optics are preferably provided manufactured from zinc selenide material to provide a broadband spectral transmission from 0.5 to 12.0 microns. A 5× zoom optical viewing means 20 provides a wide acquisition field of ~25° and a narrow, high resolution aiming field of ~5°. Dichroic elements and spectral channel realigning lenses are used to match the scenes to the VNIR/SWIR and LWIR passive arrays in a dual FPA embodiment and a narrow filter used to extract the SWIR laser returns and direct them to the 3D imaging array. The preferred optical aperture is about 55 mm. A "clip-on" visible eyepiece may be provided to allow operation when the electronic channels are inoperative.

Targeting sight 1 further comprises detector means 25 which may be provided as a single focal plane array element having a responsivity to a predetermined range of the electromagnetic spectrum (e.g., LWIR) or a dual-band focal plane array element having a responsivity to a plurality of predetermined ranges of the electromagnetic spectrum such as the LWIR, visible, SWIR or MIR spectrum. An InGaAs etched mesa diode array of the 1K×1K class may be used to provide VNIR/SWIR imaging capability. A 640×480 microbolometer array may be used to provide the thermal imaging channel. A 32×32 Geiger mode InGaAs array may be used to provide the high resolution, high sensitivity target 3D imaging mode.

In an alternative embodiment, detector means 25 may also comprise a plurality of focal plane array elements, each having a responsivity to a separate predetermined range of the electromagnetic spectrum such as comprising a pair of focal plane array elements where one is responsive to the LWIR and another responsive to the SWIR. In this embodiment, beamsplitting means may be provided to separate and transmit the respective electromagnetic spectra to the respective detectors.

Detector means 25 and related detector support electronics may be provided with separate modes of operation such as a viewing mode wherein the viewer may observe a target through eyepiece 20' and a second reticle calibration mode for the detection of a reflection and subsequent reticle calibration as is discussed more fully below.

Electronic display means 30 is provided to generate and superimpose an electronic image 35, which may be in the form or a reticle or crosshair to a viewer of the target area, on the electronic scene display of the sighting device as observed though eyepiece 20'.

Targeting sight 1 further comprises alignment frame means 15 comprising an aperture 40. Aperture 40 defines a target area therein to a viewer.

Alignment frame means 15 may comprise a ring or circular element having a predefined diameter such as is commonly referred to as a "ghost ring". When used as a weapon sight, alignment frame means 15 is preferably fixedly mounted proximal the muzzle of the barrel of the weapon to provide an accurate reference for the sight with respect to the barrel.

Alignment frame means 15 may further comprise an electromagnetically reflective surface 45 on the side nearest or facing the detector means 25.

Targeting sight 1 comprises illumination means 50 for illuminating alignment frame means 15 and for generating a reflection therefrom. Illumination means 50 is preferably an eye-safe laser element having a predetermined wavelength that is substantially the same as the responsivity range of detector means 25.

Alignment frame means 15 is not limited to a ring or circular member but may comprise any element or set of elements that can provide a suitable reflective surface sufficient to generate a reflection when illuminated by illumination means 50. By way of example and not by limitation, alignment frame means 15 may comprise a square or rectangular frame, a set of vertical parallel plates or a flat planar member so long as a sufficient electromagnetic reflection is generated for receipt by detector means 25 with spatial or pattern characteristics that can be used by processing means 55 to compute a predetermined position to place the electronic reticle in the viewers eyepiece.

Targeting sight 1 further comprises electronic processing means 55 for calculating a predetermined position within the target area based on an alignment frame illumination reflection received by the detector means 25. In a preferred embodiment of electronic processing means 55, a field programmable gate array ("FPGA"), digital signal processor ("DSP") or microprocessor element is configured to execute one or more algorithms for the processing of the output of detector element 25 in the form of the reflected electromagnetic signal received by thereby.

The processor modalities permit use of the alignment frame which may be calibrated on a firing range or in an environmentally-controlled setting prior to deployment and thus serves as a reference for the aiming cursor on the display that is adjusted to the physical fixture in the presence of environmental or electronics induced drifts. Thus, if the LIDAR subsystem results in backscatter from along the intended bullet path, atmospheric wind velocity effects can be estimated and aiming corrections introduced through cursor placement on the display. Further, if bullet impact points are observed, subsequent firing corrections can be introduced.

Sight housing 5 and alignment frame means 15 may be provided fixedly mounted on a mounting rail 10 as a single assembly that has been calibrated in a separate operation such as in an environmentally-controlled calibration setting by use of an optical table, rail or bench to provide reference calibration of enhanced precision.

In operation, illumination means 50 is pulsed by manual or electronic means and illuminates reflective surface 45 of alignment frame means 15.

The reflected illuminating beam is received by detector means 25. Detector means 25 may comprise a dedicated calibration detector element or may constitute the focal plane array detector element used by the targeting sight to image a scene of interest but that is selectively configurable to operate in a separate calibration mode.

The reflected electromagnetic signal is received by detector means 25 and processed by electronic processing means 55 to calculate a predetermined position within the target area as seen through eyepiece 20' such as the center of the aperture defined by alignment means 15.

The output of electronic processing means 55 is received by display means 15 which, in turn generates and superimposes an electronic image, which may be in the form of a reticle or cross-hair image, at the predetermined position as observed by a viewer through the eyepiece 20'. In this manner, the position of the electronic reticle as viewed through eyepiece 20' with respect to the muzzle of a weapon is precisely calibrated and positioned by using the alignment frame means as a physical reference. This in turn, permits accurate positioning of the reticle with respect to the barrel and the target, regardless of any physical or electronic "drift" that may occur in the electronic sighting elements.

To further enhance the accurate calibration and positioning of the reticle using the reflected illumination signal from the alignment frame means 30, one or more additional predetermined physical variables may be provided as inputs to one or more calibration algorithms that are executed by electronic processing means 55.

Such predetermined physical variables may include, by example and not by limitation, electronic sensor outputs in the form of humidity, temperature, altitude, barrel angle, barrel temperature, air density, or target range data, ammunition load data, projectile velocity data, ammunition caliber, or ballistic coefficient data that are entered or provided in the form of an electronic lookup table or in the form of manual data entry Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

We claim:

1. A targeting sight comprising:
    an alignment frame comprising an aperture defining a target area,
    the alignment frame mounted proximal a muzzle of a barrel of a weapon whereby the alignment frame defines the target area with reference to the muzzle,
    a sight housing comprising optical viewing means,
    a LIDAR element comprising a detector having a responsivity to a predetermined range of the electromagnetic spectrum, the LIDAR element configured for imaging the target area with the predetermined range and displaying a 3-D image representative of the target area in the optical viewing means,
    display means for displaying a reticle at a predetermined position in the optical viewing means,
    alignment frame illumination means configured to illuminate the alignment frame with the predetermined range, and,
    electronic processing means configured to position the reticle at the predetermined position based on an illumination reflection from the alignment frame received by the detector.

2. The targeting sight of claim 1 wherein the alignment frame comprises a ring member having a predetermined diameter.

3. The targeting sight of claim 1 wherein the alignment frame comprises an electromagnetically reflective surface.

4. The targeting sight of claim 1 wherein the alignment frame illumination means comprises a laser having a wavelength of about the 0.05 microns to about the 12 micron range of the electromagnetic spectrum.

5. The targeting sight of claim 1 further comprising a rail having the housing and alignment frame fixedly attached thereto.

6. The targeting sight of claim 1 wherein the predetermined position is further calculated based on one or more physical variables selected from the group consisting of humidity, temperature, altitude, barrel angle, barrel temperature, air density, range, latitude and longitude, ammunition load data, projectile velocity, ammunition caliber, target range and ballistic coefficient.

* * * * *